Oct. 9, 1945.  G. A. LYON  2,386,242
WHEEL STRUCTURE
Filed Dec. 20, 1943
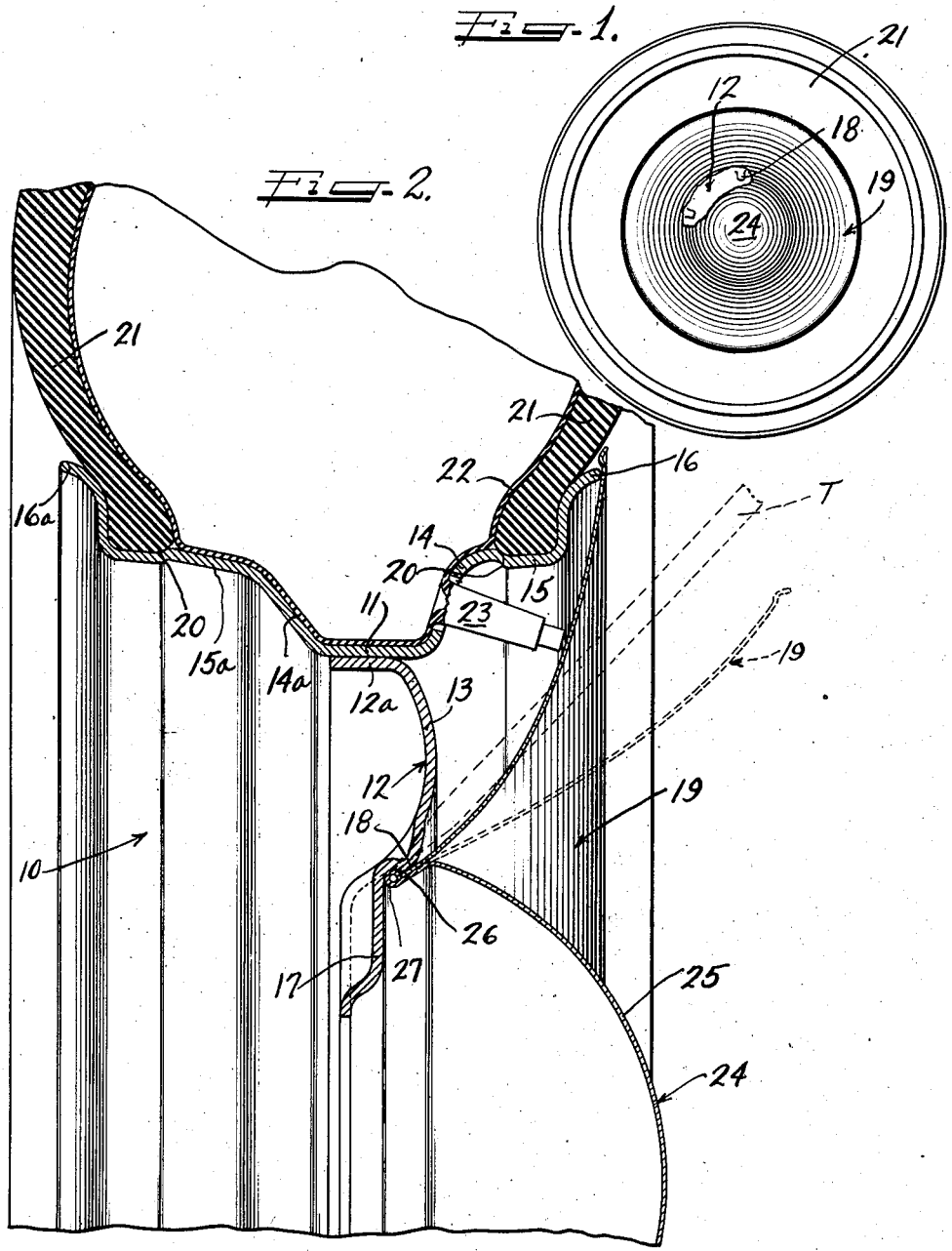
Inventor
GEORGE ALBERT LYON.
by Charles H. Hill Attys.

Patented Oct. 9, 1945

2,386,242

UNITED STATES PATENT OFFICE 2,386,242

WHEEL STRUCTURE

George Albert Lyon, Allenhurst, N. J.

Application December 20, 1943, Serial No. 514,876

1 Claim. (Cl. 301—37)

This invention is directed to an improved wheel structure and relates more particularly to an improved retaining arrangement for maintaining a cover assembly over the outer side of the wheel.

It is an important object of the present invention to provide an improved tire rim and central load bearing portion for a wheel structure, whereby the retention of a cover over the outer side the same is maintained with increased efficiency without necessitating the use of auxiliary retaining means.

It is another object of the present invention to provide an improved wheel structure having a novel cover retaining arrangement thereon, the wheel structure being such that the cover secured thereto may extend radially inwardly of the wheel and whereby the necessity of the cover extending axially inwardly with a relatively abrupt curvature is avoided, thereby to afford a more desirable ornamental effect whereby the cover more nearly simulates a continuation of the side wall in a tire to give the appearance of being a part thereof and to give the appearance of being a massive white side wall on a wheel structure of minimum dimensions, when colored white.

It is still a further object of the invention to provide an improved retaining arrangement for maintaining over the outer side of a wheel structure, an improved cover assembly, including a radially outer annular portion formed from sheet synthetic plastic material or the like, whereby it may be flexed temporarily, resiliently locally and whereby it is self-sustaining as to form so as to immediately snap back into initial configuration when distorting pressures are relieved therefrom.

It is a more specific object of the present invention to provide an improved wheel structure having a tire rim of the drop center type provided with a base flange, wherein the base flange is disposed in a position axially offset from the medial plane of the wheel and also having an improved central load bearing portion, whereby there is provided retaining means for detachable engagement of a cover assembly to maintain the same over the outer side of the wheel structure.

In accordance with the general features of the present invention there is provided herein an improved wheel structure including a tire rim of the drop center, flanged type, the tire rim including a base flange, opposite side wall flanges and opposite intermediate flanges, together with opposite edge portions, the opposite side wall flanges and intermediate flanges being of greater axial dimension on one side of the wheel than those on the other, thereby to position the central, base flange in a position disposed axially outwardly of the medial plane of the wheel, there also being a central load bearing or spider portion provided with a radially outer peripheral, axially inwardly extending skirt arranged for attachment to the adjacent surface of the base flange, said spider having formed at a radially inner part thereof, a series of circumferentially spaced, circularly disposed protrusions for retainingly engaging, in detachable relationship, a cover assembly.

Other objects and advantages of the invention will become apparent from the following description and accompanying drawing, in which:

Figure 1 is a side elevational view of a wheel structure embodying my invention, parts being broken away for illustrative purposes; and Figure 2 is a fragmentary, radial cross-sectional view of the wheel structure shown in Figure 1.

As shown best in Figure 2, the tire rim 10 includes a base flange 11 having opposite side wall flanges 14 and 14a, opposite intermediate flanges 15 and 15a and opposite edge portions 16 and 16a. The central load bearing portion or spider 12 is provided with a generally axially inwardly extending peripheral skirt 12a which is secured to the base flange 11 of the rim 10 by riveting or welding or the like. The intermediate portion 13 of the spider or central load bearing portion 12 is slightly cross-sectionally bowed and is disposed in a plane which extends generally through the axially outer edge of the base flange 11 of the tire rim 10. The intermediate portion 13 of the spider 12 terminates in an axially inwardly offset bolt-on flange 17 by means of which the wheel may be secured as by wheel bolts to a suitable part of a vehicle such as the brake drum or the like. Intermediate the portions 13 and 14 of the spider there is provided a plurality of generally axially outwardly, slightly radially inwardly extending, circumferentially spaced, circularly aligned protuberances 18. As will be seen, these protuberances 18 are formed from the material of the spider and are preferably punched outwardly of the spider 12 from the rear side thereof.

Referring particularly to the relationship of the tire rim 10 and the spider 12, it will be seen that, to the end that a cover member such as that shown at 19 may be secured over the wheel to best simulate a continuation of the side wall of a tire, the cover retaining protuberances 18 should preferably be disposed as far radially inwardly on the wheel as possible and yet be disposed in a plane as far axially outwardly from the medial plane of the wheel as is possible.

To this end the two sides of the tire rim 10 are provided with varying dimensions whereby attachment of the flange 12a of the spider 12 to the base flange 11 of the rim will automatically result in a proper disposition of the protuberances 18. As will be seen, this end is accomplished herein by providing a side wall flange 14a on one side which is considerably longer than, and disposed at a more shallow angle than the companion side wall flange 14 while, at the same time, the intermediate flange 15a is provided with a length considerably greater than that of the companion intermediate flange 15. With this construction it will be seen that the base flange 11 is disposed in an axially outward position from the medial plane of the wheel.

If desired, the intermediate flanges 15 and 15a may be provided with intermediate shoulders 20 which serve positively to align the opposite beads of a tire 21 which is disposed in the tire rim. Furthermore, the respective shoulder 20 aids in preventing slippage of the respective tire bead inwardly on the elongated flange 15a. It will be seen that the tire 21 is further provided with an inner tube 22 which in turn has a tire valve stem 23 that is aligned with and extends through a suitable aperture in the side wall flange 14. It will also be seen that the length of the valve stem 23 is such that it is housed entirely behind the cover part 19 to be described presently.

With the foregoing construction it will be seen that the protuberances 18 which serve as a point of attachment for a cover assembly, as will be clearly described presently, are located in the desired position in that they are aligned with a plane axially outwardly of the medial plane of the wheel and at the same time are aligned on a circle disposed radially inwardly toward the center of the wheel and far beyond the junction of the spider 12 and the tire rim 10.

In the present construction the cover assembly includes a radially outer annular part 19 having a cross-sectional expanse of such configuration that it generally simulates the curvature of the side wall of the tire 21 and extends from the edge portion 16 radially inwardly to a point adjacent the protuberances 18. The cover assembly shown herein is completed by the provision of a central circular hub cap simulating member 24 having a crowned portion 25 terminating in a generally axially inwardly, radially inwardly, obliquely disposed resilient snap-on flange 26 which in turn terminates in a rigidifying, snap-on bead 27. As will be seen, the radially inner margin of the cover member 19, which cover member is preferably formed from sheet synthetic plastic material thereby to be locally, temporarily, resiliently flexible and yet self-sustaining as to form whereby it snaps back immediately into initial configuration when distorting pressures are relieved therefrom, is disposed in surface engagement with the outer side of the flange 26 of the central circular hub cap simulating member 24. Thus it will be seen that the two cover members are normally retained together as a unitary structure after the cover member 19 has been elastically snapped over the outer part of the snap-on bead 27 by movement of the cover member 19 axially outwardly relative to the cover member 24. The cover member 24 may also be formed from sheet synthetic plastic material but is preferably formed from a more rigid material such as stainless sheet steel or the like, whereby it may be provided with a permanent, high luster to give the desired ornamental effect.

To the end that the tire may be inflated by application of the nozzle of an air hose to the end of the stem 23, it will be seen that the operator need merely flex the cover member 19 into the dotted line position shown in Figure 2, whereby the valve stem will be entirely accessible. Furthermore it will be seen that after the cover assembly has been attached to the wheel structure by being concentrically aligned therewith and then moved axially inwardly so that the snap-on head 27 has passed over the protuberances 18, the operator need merely flex the cover member 19 outwardly as described above and insert the point of a pry-off tool T behind the snap-on bead 27 at a point preferably between two of the protuberances 18. Thereafter manipulation of the tool by raising the handle thereof radially outwardly will pry the adjacent portion of the snap-on bead 27 axially outwardly over the peaks of the protuberances 18 to permit complete removal of the cover assembly from the wheel.

In view of the above described novel wheel structure it will be seen that there may be provided, for attachment to a wheel structure, a cover assembly having a radially outer part provided with a long gradual sweep from the edge portion 16 of the tire rim inwardly to the protuberances 18, the attachment operation not requiring an abrupt curvature of the radially inner part of the cover member 19 axially inwardly to engage the snap-on retaining bead.

What I claim is:

In a cover assembly for disposition over the outer side of a wheel structure having a tire rim and a central load bearing portion provided with cover retaining means, a radially outer, annular cover member formed from resiliently yieldable material and having flexible characteristics whereby it may be locally flexed from the outer side thereof and it can return to its initial configuration upon relief of the flexing pressure therefrom, and a central, relatively rigid hub cap member, said hub cap member having a flange at the peripheral margin thereof for receiving the inner margin of the annular cover member in surface relationship to support the same, said hub cap member also having a retaining portion for detachably engaging with the cover retaining means on the wheel and being arranged to draw the flange thereon toward the retaining means to retain the inner margin of the annular cover member toward the retaining means to retain the inner margin of the annular cover member in cushioning relation between the retaining means and the flange of the hub cap member whereby it is held to afford flexing action from the outer edge thereof.

GEORGE ALBERT LYON.